Nov. 11, 1941.    H. J. CATES    2,262,354
CONTROL APPARATUS
Filed Dec. 3, 1938    2 Sheets-Sheet 1

Inventor
HENRY J. CATES

Nov. 11, 1941.    H. J. CATES    2,262,354
CONTROL APPARATUS
Filed Dec. 5, 1938    2 Sheets-Sheet 2

INVENTOR.
HENRY J. CATES
BY George M. Murbaugh
ATTORNEY

Patented Nov. 11, 1941

2,262,354

UNITED STATES PATENT OFFICE 2,262,354

CONTROL APPARATUS

Henry J. Cates, Milwaukee, Wis., assignor to The Brown Instrument Company, Philadelphia, Pa., a corporation of Pennsylvania Application December 3, 1938, Serial No. 243,818

4 Claims. (Cl. 234—1.5)

The present invention relates to control instruments and more particularly to a means for adjusting the control member of a temperature measuring instrument in such a manner that the instrument will control the value of the temperature in amounts varying in accordance with a predetermined time schedule.

In the measurement and control of high temperatures it is customary to use a potentiometer instrument. Some types of these instruments are provided with a so-called control table which is moved along the instrument parallel to the chart to a position above the chart corresponding to the value at which it is desired to maintain the value of the temperature which is being controlled. The control table is provided with means thereon, cooperating with a part of the potentiometer recording mechanism to actuate mechanism which controls the temperature.

It is an object of the present invention to provide a simple and effective means to shift the control table to various positions along the chart in order to vary the temperature of the space being controlled in accordance with a predetermined time schedule. It is a further object of the invention to so vary the position of the control table automatically by the use of a photocell or photocells and a relay, to actuate mechanism that will move the control table in the desired direction at a predetermined rate.

To this end the photocell or photocells, as the case may be, are mounted on the control table in such a manner that they are responsive to a variation in color of the chart which color has been placed thereon in accordance with the schedule of temperature to be followed. As the photocell resistance changes in response to the color of the chart a relay is actuated to energize a motor which shifts the control table in the proper direction and at the proper rate.

It is a further object to accomplish movement of the control table by means of a contact on the control table which engages with a metallic coating in the chart to energize the control table motor. The coating has an edge shaped to conform with a desired time schedule.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

Figure 1:
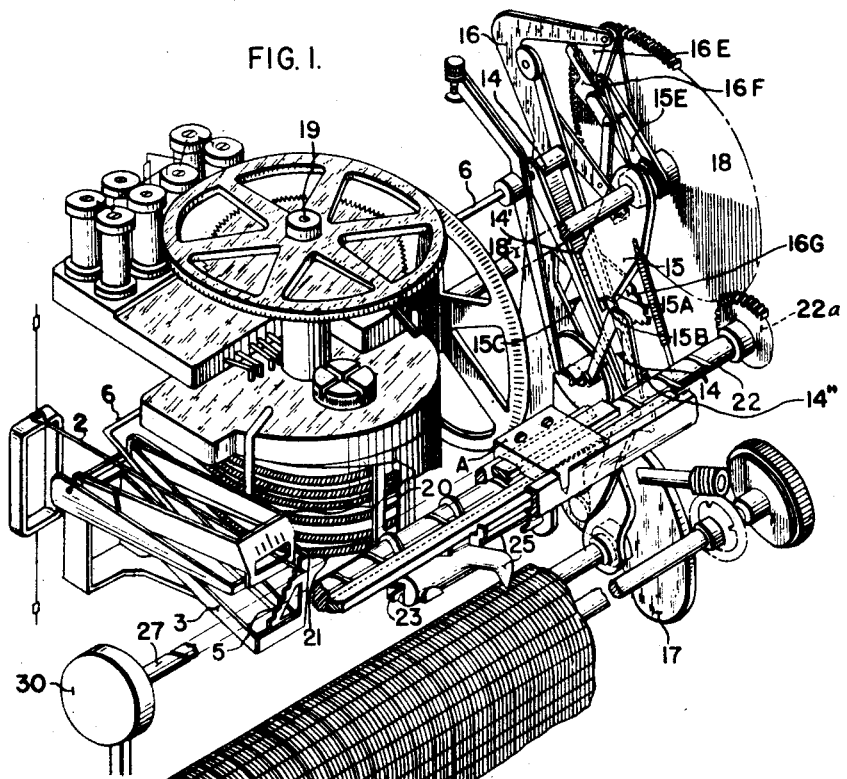
Fig. 1 is a perspective view of the potentiometer mechanism showing the operative parts thereof.
Figure 2:
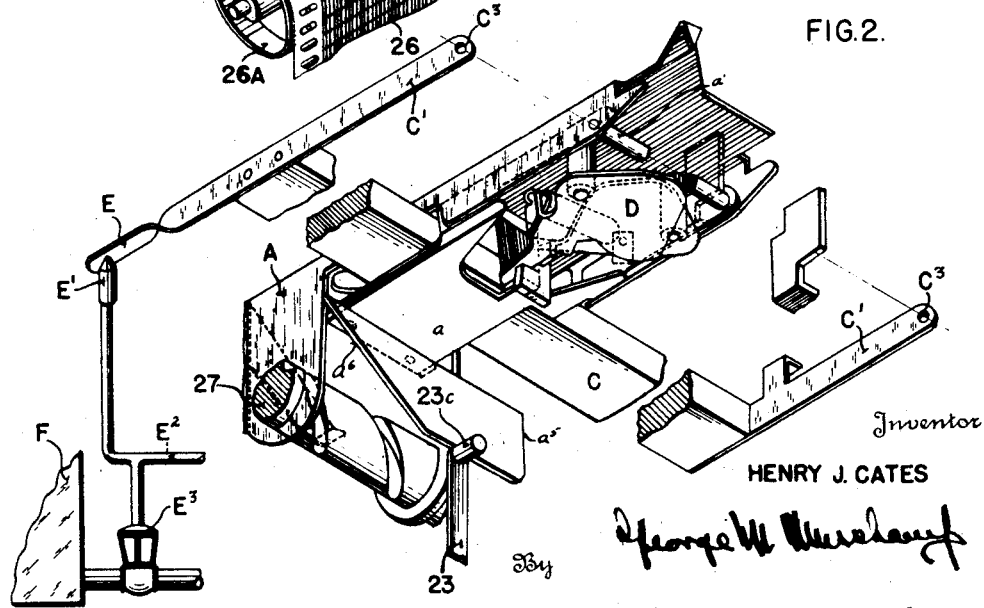
Fig. 2 is a perspective view of the control table, without the photocells mounted thereon.

The potentiometer instrument shown in Figures 1 and 2 is a selfbalancing potentiometer of the recording controlling type. The potentiometer structure itself is of the type fully shown and described in the patents to Harrison 1,946,280, issued February 6, 1934, and to Harrison et al. 2,150,502, issued March 14, 1939, and the control provisions are similar to those in Harrison Patent 2,112,091, dated March 22, 1938. The present invention is an improvement on the above mentioned potentiometers whereby a time cycle control may be obtained. It is, therefore, only necessary to describe the operation of the potentiometer relay mechanism herein, in sufficient detail to show how the improvements cooperate with the rest of the structure.

Referring first to Figure 1, there is shown a galvanometer having a pointer 2 which deflects in response to variations in the value of a condition to be measured. This pointer, depending upon its position, is periodically engaged by one of the steps 5, of the member 3 that acts through a shaft 6 to position a secondary pointer 14. A constantly rotating cam 17, driven from a motor, not shown, oscillates a pawl carrying lever 16 from a fixed position to a position governed by engagement between one of the steps on a member 16G attached to lever 16 and a projection 14" on the end of secondary pointer 14. As the lever 16 moves to the right in Figure 1 into its above mentioned variable position, one of the pawls 16E or 16F carried thereby engages a tooth on the edge of large gear 18 to rotate that gear. The pawl 16E or 16F that engages gear 18 and therefore determines the direction of rotation of the gear depends upon the deflection of the galvanometer pointer 2 to one side or the other of its neutral position. This is controlled by means of the engagement of one of the steps 15A, 15B or 15C of a member 15 with the edge of an opening 14' in the secondary pointer. If the steps 15B engages with the opening edge, as it will when the galvanometer pointer is in its neutral position, neither of the pawls will engage gear 18. When, however, either step 15A or 15C engages the edge of opening 14', as it will when the value of the condition is below or above what it was during the last cycle of the instrument, an arm 15E connected with the member 15 will force either pawl 16E or 16F into engagement with the gear 18.

As the gear 18 rotates in rebalances the potentiometer circuit and shifts a recording pen along a chart. The first of these operations is accomplished by means of the shaft 18' that, through the gearing shown, rotates shaft 19. A contact 20 is moved with the shaft 19 to change its position along a potentiometer slidewire 21 to rebalance the potentiometer circuit. The second operation is accomplished by means of engagement between gear 18 and a small gear 22a carried on a helically threaded shaft 22 that is journalled in the side plates of the instrument. Supported on the shaft 22 is a pen carriage 23 which is moved along the shaft as the shaft rotates by means of engagement between a suitable pawl carried thereby and the helical thread of the shaft 22. Therefore, as the gear 18 is rotated in response to potentiometer unbalance a pen 25 carried by the pen carriage 23 will be shifted across a chart 26 to record the value of the condition being measured. The chart is moved under the pen at a constant speed by means of a constantly driven chart drum 26A.

The control provisions of the instrument comprise a control table A that is supported upon the frame of the instrument and a threaded shaft 27 that is parallel to the shaft 22. The control table is adapted to be moved across the chart 26 to a position corresponding to the value at which it is desired to maintain the condition. The control table A has pivoted to it at $a'$ a support $a$ that has attached to it a downwardly extending cam member $a^5$. This cam member has an edge $a^6$ that is adapted to engage with a roller 23C that is carried by the pen carriage 23. Therefore, as the pen carriage 23 moves relative to the control table A the member $a$ will be raised or lowered around its pivot $a'$ due to engagement of roller 23C and cam edge $a^6$. A bar C is attached to supporting levers C' that are pivoted at $C^3$ in the sideframes of the instrument. This bar C is in sliding relation with the part $a$ so that the control table A may be shifted and is in engagement with part $a$ so that as $a$ moves around its pivot $a'$ the bar C will be moved around pivots $C^3$ that are aligned with $a'$.

In order to vary the value at which the instrument will maintain the condition, described herein as temperature, it is only necessary to rotate the shaft 27 to thereby shift control table A to the proper position above chart 26. This may be accomplished either manually or by some power means such as a reversible motor 30 connected thereto.

The manner in which movement of part $a$ and bar C with respect to the control table A is used to control the condition to which the galvanometer 2 is responsive may well be similar to that shown in Patent 2,112,091, above referred to, but is shown diagrammatically herein as comprising an extension E of the left arm C'. This extension acts as a flapper valve to vary the escape of air through a nozzle E' that is supplied from some suitable source past a restriction $E^2$ and that is also in communication with the diaphragm of a valve $E^3$. The valve $E^3$ regulates the passage of a fluid such as fuel to a furnace F and thereby controls the temperature thereof. In operation as the bar C is raised and lowered around points $C^3$ the flapper E variably throttles the nozzle E' and thereby changes the air pressure applied to the diaphragm of valve $E^3$ to change its opening and the amount of fuel supplied to the furnace.

Figure 3:
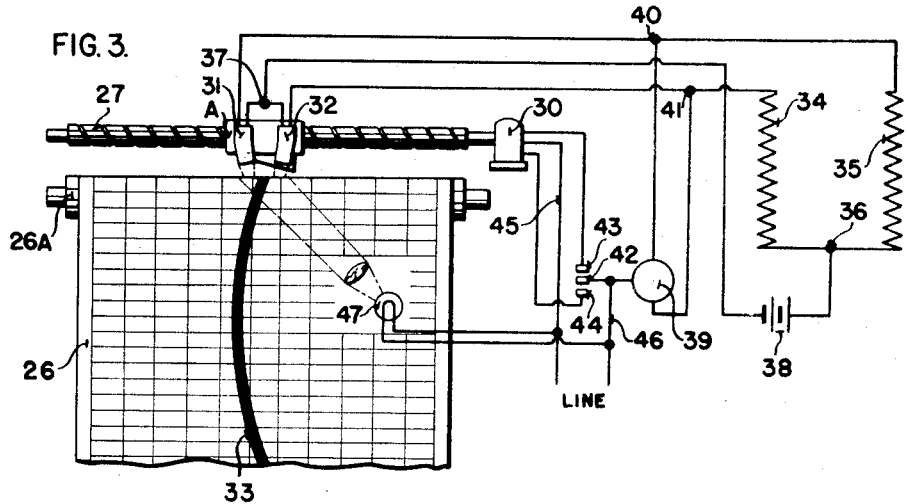
Fig. 3 is a diagrammatic view of a means for moving the control table using two photocells.

Reference is now made to Fig. 3 wherein there is shown one form of control circuit for the motor 30. In this embodiment of the invention a pair of photocells 31 and 32, which may well be selenium cells, are mounted on the control table A in such a fashion that they are focused on the chart 26 on each side of a heavy line 33. There may, if necessary, be incorporated with the cell mounts some usual form of telescopic arrangement to limit the light rays picked up by the cells to an area approximately one-sixteenth of an inch in diameter. One terminal of each cell is connected to a terminal of the other while the second terminal of each cell is connected to one end of a fixed resistance 34 or 35, the opposite end of the resistances being connected together to form a bridge circuit. Across the bridge between the resistances at 36 and between the cells at 37 there is connected a source of potential such as a battery 38. The terminals of a sensitive electrical instrument such as a galvanometer 39 are also connected across the bridge at 40 and 41 between each cell and its adjoining resistance.

Deflection of the galvanometer in response to unbalance of the bridge will bring a contact 42 on its pointer into engagement with either of contacts 43 or 44 that are connected by suitable conductors to the fields of the reversible motor 30. The other side of each field is connected by a conductor 45 to one side of a line and the pointer of the galvanometer is connected by a conductor 46 to the other side of the line.

A light source 47, also connected to the line, is provided, and is so positioned that rays therefrom are reflected by the chart toward the cells except when the rays are absorbed by the line 33.

In preparing the device for operation it is first necessary to take the chart, which is provided with horizontal time lines and vertical temperature lines, and draw thereon with a heavy black marking device the line 33 that may be approximately one-sixteenth of an inch wide. This line is drawn with reference to the temperature and time markings on the chart so that it will follow the schedule at which it is desired to maintain the temperature of the space which is being measured and controlled. The chart is then replaced in the instrument and shaft 27 is rotated by hand until the photocells are so positioned that they will pick up light rays reflected by the chart from opposite sides of the line 33.

When the instrument is thereafter placed in operation the chart will be moved beneath the photocells and move the line 33 beneath the control table A upon which the photocells 31 and 32 are mounted. As long as the line 33 remains between the cells the light rays from the chart will be reflected into them and their resistances will remain the same. When, however, due to the movement of the chart, the line 33 moves relative to the photocells in a lateral direction one of them will then be focused on the line and less light will reach it. If, for example, the line 33 moves to the left under cell 31 less light will be reflected into that cell and its resistance will correspondingly increase to unbalance the bridge circuit. The pointer of the galvanometer 39 will therefore deflect to bring its contact 42 into engagement with one of the contacts 43 or 44 to energize motor 30 for rotation. The galvanometer will be deflected in a direction to cause motor 30 to rotate shaft 27 in a direction to shift the control table A to the left. When the photocell 31 has been moved so that it is again focused on the chart the bridge circuit will be balanced and the galvanometer will return to its neutral position to break the circuit to motor 30.

Figure 4:
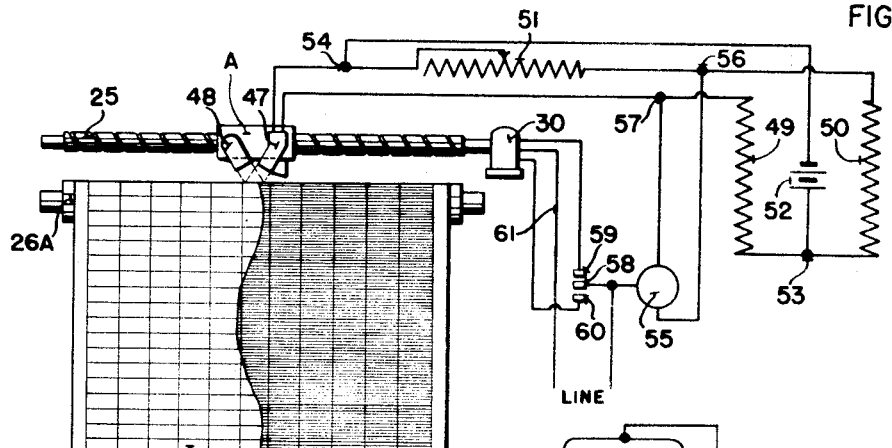
Fig. 4 is a view similar to Fig. 3 showing the use of only one photocell.

The embodiment disclosed in Fig. 4, differs from that of Fig. 3, mainly in that only one photocell is used. In this case a photocell 47 and a light source 48 are both mounted on the control table A in such a manner that light rays directed from the source 48 to the chart 26 are reflected therefrom to the photocell 47.

In this embodiment of the invention, as in that of Fig. 3, the photocell 47 forms part of a bridge circuit which also includes the fixed resistances 49 and 50 and the variable resistance 51. A source of current such as battery 52 is connected across the bridge from between the fixed resistances at point 53 between the cell 47 and variable resistance 51 at point 54. A galvanometer 55 is connected across the other terminals 56 and 57 of the bridge and has its pointer provided with a contact 58 which is directly connected to one side of some suitable power line. The contact 58 is adapted, upon deflection of the galvanometer to engage with either one of contacts 59 or 60, which are connected to the two fields of the reversible motor 30. The other side of the motor fields are connected by a conductor 61 to the other side of the line.

In this embodiment instead of having a line such as line 33 drawn on the chart, the chart 26 is printed with a dark color 62 over a portion of it. The inner edge of the dark printing forms a schedule curve along the chart that conforms to the schedule at which it is desired to maintain the temperature of the space whose temperature is to be controlled.

In the operation of this embodiment of the invention the value of the resistance 51 is so adjusted that it is equal to the resistance of the photocell 47 when the latter receives light rays from a portion of the unshaded chart area and at that time the table A is suitably positioned with respect to the curve formed by the shaded area.

When, after inserting the chart in the instrument, the device is placed into operation if the control table is not properly positioned over the schedule curve the resistance of the photocell 47 will either be higher or lower than that of the resistance 51 depending upon whether it is receiving light reflected from the dark portion 62 of the chart or whether it is receiving light reflected from the normal surface of the chart to the left of the dark portion. In either case the bridge circuit will be unbalanced and the galvanometer 55 will be deflected to bring its contact 58 into engagement with one of contacts 59 or 60 to energize motor 30 for rotation. The motor 30 will be energized to rotate the shaft 27 in a direction to move the control table toward the schedule curve on the chart. Upon arriving at that point the resistance of the photocell will be equal to that of the resistance 51 and the bridge circuit will be balanced, thereby permitting the galvanometer pointer to return to its neutral position and deenergize the motor 30.

Thereafter as the chart is moved under the control table the shifting of the schedule curve relative thereto will cause an unbalance of the bridge circuit which in turn will cause deflection of the galvanometer 55. The galvanometer pointer will move its contact 58 in a direction to energize the motor 30 for rotation to shift the control table A along the chart until it is again properly positioned. It will be apparent to those skilled in the art that other types of relays may be used to energize the motor 30 which drives the threaded shaft 27 in response to changes in the intensity of light reaching the photocells than the type of relay disclosed herein.

Figure 5:
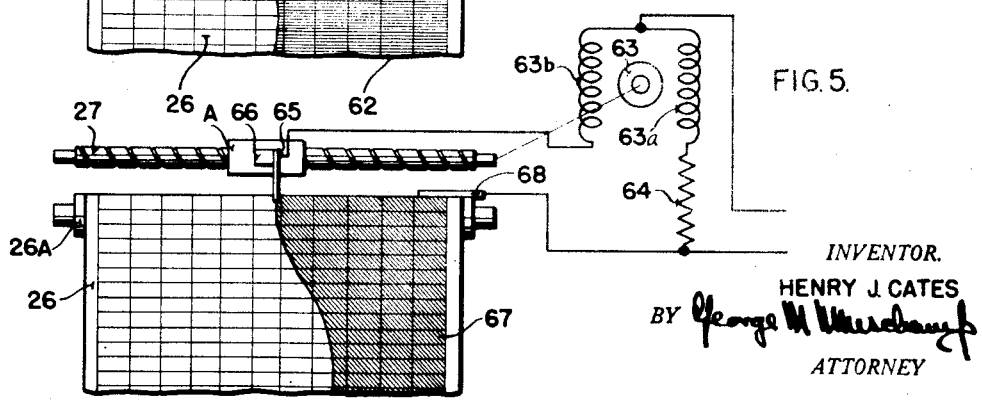
Fig. 5 is a view of a further embodiment of the invention.

Another form of my invention is disclosed in Fig. 5 in which movement of the control table A is dependent upon the direct engagement of a member with the chart rather than by the use of reflected light rays. In this embodiment of the invention a motor 63, corresponding to the motor 30 of Figs. 3 and 4, is used to drive the shaft 27. The motor 63 differs from the motor 30 in that instead of having fields of equal strength, it has one field 63a connected directly to the line through a resistance 64, and a second field 63b connected intermittently to the line in a manner to be described. In this manner the field 63a tends at all times to rotate the motor in one direction while when the field 63b is energized it will overcome field 63a and rotate the motor in the reverse direction.

The field 63b is connected to a brush or contact 65 that is mounted on a block of insulating material 66 attached to the control table A. The brush 65 engages the chart 26 that is in this case provided with a coating of metallic ink or similar conducting material 67 whose inner edge forms on the chart a line that corresponds to the desired time schedule. Another brush 68 engages the portion 67 and extends to one side of the line.

In the operation of this embodiment the motor field 63a that is continuously energized tends to rotate motor 63 and shaft 27 in a direction to move the control table up-scale or to the right in Fig. 5. As soon, however, as the brush 65 engages the conducting surface 67 the field 63b is energized to overcome field 63a and rotate motor 63 and shaft 27 in a direction to move the control table to the left. This continues until brush 64 leaves the portion 67, when the operation is reversed. It will thus be seen that the motor 63 is kept in a continual state of vibration and the table A will exactly follow the time schedule line. The movements of the control table A are of such small amplitude that they will ordinarily have no effect on its position other than the necessary shifting of the table to follow the time line. It will be obvious that for the purposes of this invention the conducting surface 67 may either be made as shown or may take other forms.

Each of the above described embodiments of the invention may be used in any application where it is wished to keep a predetermined schedule of temperature by the instrument by simply making the correct form of marking on the chart. It is preferable, however, to use the embodiment of Fig. 3 where upon each operation of the instrument, a different schedule of temperature is to be maintained because it is comparatively easy to unroll enough chart to take care of a single operation and draw the schedule line thereon. The chart can then be rolled and drawn through the instrument in usual way for the instrument to cause its control mechanism to be actuated in accordance with the schedule of line 33.

It is preferable to use the embodiment of Fig. 4 when the instrument is to be used to repeat the same temperature cycle over and over again under which circumstances the more time consuming printing or marking the shaded area is justified. The embodiment of Fig. 5 may be used in either type of control depending upon the manner in which the conducting area 67 is placed upon the chart.

By the use of the mechanism of my invention a potentiometer type of instrument can be made to control the value of the temperature of a space accurately for any desired schedule. This mechanism is both inexpensive to build and easy to install, and may be used on both new and old instruments with equal facility.

While in accordance with the provisions of the statutes, I have illustrated and described the best form of my invention now known to me, it will be apparent to those skilled in the art that changes may be made in the form of the apparatus disclosed without departing from the spirit of my invention, as set forth in the appended claims and that in some cases certain features of my invention may sometime be used to advantage without a corresponding use of other features.

Having now described my invention, what I claim as new and desire to secure by Letters Patent is:

1. In a measuring and control instrument, recording means to record the value of a condition, a chart adapted to be recorded upon by said recording means, a line on said chart, an element cooperating with said recording means to control said condition and movable across said chart to positions corresponding to the value at which it is desired to maintain said condition, means mounted on and moving with said element responsive to the position of the line on said chart, and means actuated by said responsive means to adjust said element across said chart.

2. In a measuring and control instrument, the combination of an element movable to positions corresponding to the values at which it is desired to maintain a condition, a control part mounted for movement on said element to control said condition, a pen carriage movable relative to said part, a pen on said carriage adapted to record the present value of said condition, cooperating means between said pen carriage and said control part to move the latter upon movement of the former relative to the element a chart advanced beneath said pen upon which said record is to be made, means on said chart to indicate a desired schedule, light sensitive means mounted on said element responsive to the indications of said chart, means to move said element, and means actuated by said light sensitive device to operate said moving means whereby the element and part will be moved relative to the pen carriage.

3. In a measuring and control instrument, the combination of a threaded shaft, a reversible motor for driving said shaft, an element mounted on said shaft and adapted to be moved relative thereto upon rotation of the motor to a position corresponding to a value at which it is desired to maintain a condition, recording means to record the value of said condition, a first part on said element, a second part attached to and movable with said recording means cooperating with said first part, means operated thereby to control said condition a chart upon which a record of the value of the condition is to be placed movable transversely of the element and shaft, said chart having thereon a line indicative of the values at which it is desired to maintain said condition, light sensitive means mounted on said element and responsive to relative transverse movement of said line and element, and relay means operated by said light sensitive means in response to relative transverse movement of said line and element to control the energization of said motor.

4. In a measuring and control instrument, the combination of a chart, an exhibiting member cooperating with said chart to indicate the value of a condition, a control element cooperating with said exhibiting member to control said condition, means to shift said element relative to said member in accordance with a predetermined schedule and means on said chart to control the operation of said shifting means.

HENRY J. CATES.